United States Patent [19]

Nick

[11] 3,786,419

[45] Jan. 15, 1974

[54] SYNCHRONIZING CLOCK SYSTEM FOR A MULTI-TERMINAL COMMUNICATION APPARATUS

[75] Inventor: Howard H. Nick, Poughkeepsie, N.Y.

[73] Assignee: International Business Machines Corporation, Armonk, N.Y.

[22] Filed: Dec. 26, 1972

[21] Appl. No.: 317,916

[52] U.S. Cl. .......... 340/147 SY, 178/69.5 R, 178/68
[51] Int. Cl. .......... H04l 15/00, H04q 5/06
[58] Field of Search .......... 340/147 SY; 178/69.5 R, 68, 58; 179/15 BD; 333/18, 24

[56] References Cited

UNITED STATES PATENTS

| | | | |
|---|---|---|---|
| 3,516,065 | 6/1970 | Bolt et al. | 340/170 |
| 3,601,543 | 8/1971 | Maniere et al. | 179/15 AL |
| 3,742,452 | 6/1973 | Audretsch, Jr. et al. | 340/163 X |

*Primary Examiner*—Donald J. Yusko
*Attorney*—Harold H. Sweeney, Jr.

[57] ABSTRACT

A synchronizing clock system is provided for a multi-terminal communication apparatus having coupling connecting devices and having at least one source of information signals. The information signals are propagated along a transmission medium in one direction. The information signals on the main transmission medium are coupled from and to the transmission medium. Clock signals are provided which propagate along the transmission medium in the opposite direction to the information signals. These clock signals are coupled from the transmission medium to provide the synchronization for the system.

9 Claims, 4 Drawing Figures

PATENTED JAN 15 1974

3,786,419

SYNCHRONIZING CLOCK SYSTEM FOR A MULTI-TERMINAL COMMUNICATION APPARATUS

BACKGROUND OF THE INVENTION

This invention relates to a synchronizing clock system and, more particularly, to a synchronizing clock system for synchronizing a multi-terminal communication apparatus without affecting the data transmission rate of the signals in the communication apparatus.

In data handling and other communication systems, a main data transmission line having a number of input/output terminals connected thereto have generally become known as transmission or communication loops. At these various terminals, information can be extracted from or added to the main transmission line. In patent application Ser. No. 314894, filed Dec. 13, 1972, there is shown a multi-terminal communication apparatus which utilizes directional couplers for coupling the information from a main transmission medium to a controller which is located between a terminal and the main transmission medium. The controller allows the information signals on the transmission medium to be replaced with new information signals at each terminal. Branch information signals are obtained from the main transmission medium by coupling without destroying or interrupting the propagation of the information signals on the transmission medium. New information signals are generated at the terminal and applied to the transmission medium by coupling. The branch information signals are phase inverted when the new information signals are provided. These phase inverter signals are applied to the transmission lines by coupling so as to cancel the corresponding information signals on the transmission medium. The new information signals are coupled onto the transmission medium in the space left by the cancelled information signals. In a system, such as described above, synchronization of the various units should be maintained to ensure error limited operation of the entire communication system. Various schemes, such as a bi-frequency arrangement or a number of very stable frequency clock pulse sources have been used. Of course, it has been proposed that the data pulses have interspersed therewith various synchronization pulses to ensure that each of the terminal controllers are maintained in synchronism with one another. These arrangements require considerable additional circuitry or, in the latter case, impede the data transfer rate of the system.

Accordingly, it is the main object of the present invention to provide a synchronizing clock system for a multi-terminal communication apparatus in which the data transfer rate is not at all impeded by synchronizing clock pulses.

It is a further object of the present invention to provide a synchronizing clock system which requires practically no additional circuitry at the various terminal controllers.

It is another object of the present invention to provide a synchronizing clock system for a multi-terminal communication apparatus in which the clock pulses are propagated along the transmission medium in the opposite direction to that of the information signals.

Briefly, a synchronizing clock system is provided for a multi-terminal communication apparatus having coupling connecting devices and having at least one source of information signals. The information signals are propagated along a transmission medium in one direction. The information signals on the main transmission medium are coupled from and to the transmission medium. Clock signals are provided which propagate along the transmission medium in the opposite direction to the information signals. These clock signals are coupled from the transmission medium to provide the synchronization for the system.

The foregoing and other objects, features and advantages of the invention will be apparent from the following more particular description of an embodiment of the invention as illustrated in the accompanying drawings.

Figure 1:
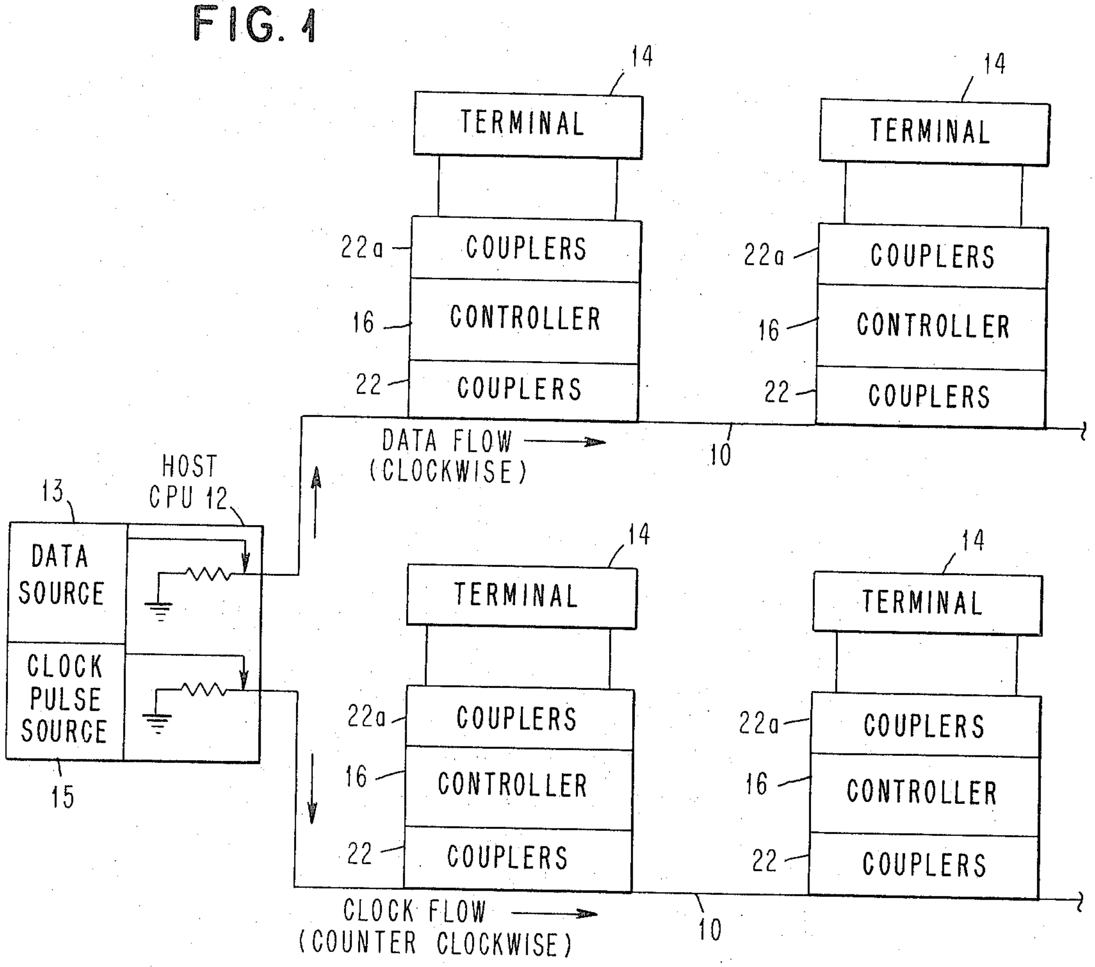
FIG. 1 is a schematic diagram showing the multi-terminal communication system which includes the clock synchronization system.

FIG. 1 shows a multi-terminal communication system in which the synchronizing clock system of the present invention is applied. The communication system generally consists of a central processing unit or host 12 which sends out information signals along the transmission line 10 in a clockwise direction to various input/output attachments shown as terminals 14. These information or data signals are obtained from the main transmission line 10 by a controller 16 which is essentially an interface between the transmission line 10 and the input/output attachment or terminal 14. The controller 16 receives the information signals from the transmission line 10 and in turn can send the signals to the terminal 14 or put them back onto the transmission line 10. The terminal can also send information to the controller to replace information on the transmission line. The transmission line 10 can be a continuous loop or can be a long length of transmission lines terminated at some point other than the host CPU 12. The controller 16 which interfaces the transmission line 10 and the terminal 14 is isolated from the transmission line 10 and the terminal 14 by couplers 22 and **22*a*** known as stripline directional couplers which have the capability of coupling signals from one line to another without destroying the original signals.

The host CPU 12 also provides clock pulses of a predetermined frequency which are applied to the communication loop so as to propagate along the loop in a counterclockwise direction. That is, the clock pulses are applied to the transmission medium 10 so as to propagate in the opposite direction to the data pulses. The clock pulses are generated from a clock pulse source which generates a continuous stream of the clock pulses at a predetermined frequency. Thus, the clock pulses extend completely around the transmission loop and would appear to be a standing wave. The couplers **22,22*a* used for coupling the data signals to and from the controller 16 are also used to couple the clock pulses to and from the controller. These directional couplers 22,22*a*** can be of a stripline variety which consist essentially of two parallel adjacent printed circuit striplines sandwiched between two ground planes which are conductively and capacitively coupled so that the edges of a first pulse, of fast rise and fall time characteristics, propagating along one line, produce a positive pulse and a negative pulse in the other line. The lines are back coupled or directional in that the thus produced pulses propagate along the second line in a direction opposite to the direction in which the first pulse propagates along the first line. The energy transferred between the coupling segments of the two element directional coupler is affected by the various physical characteristics of the directional coupler such as the length, wideth and distance between the coupling segments. In the present invention, it is possible by the inherent directivity associated with a directional coupler, to select and differentiate between the two electrical signals, which may be of the same frequency, but propagating on a single transmission loop in opposite directions. The signals travelling in the opposite directions in a given transmission loop are the clock and data information. Even though they arrive simultaneously at the directional coupler, the coupler is capable of responding to the desired signal because of its built-in directivity.

Figure 2:
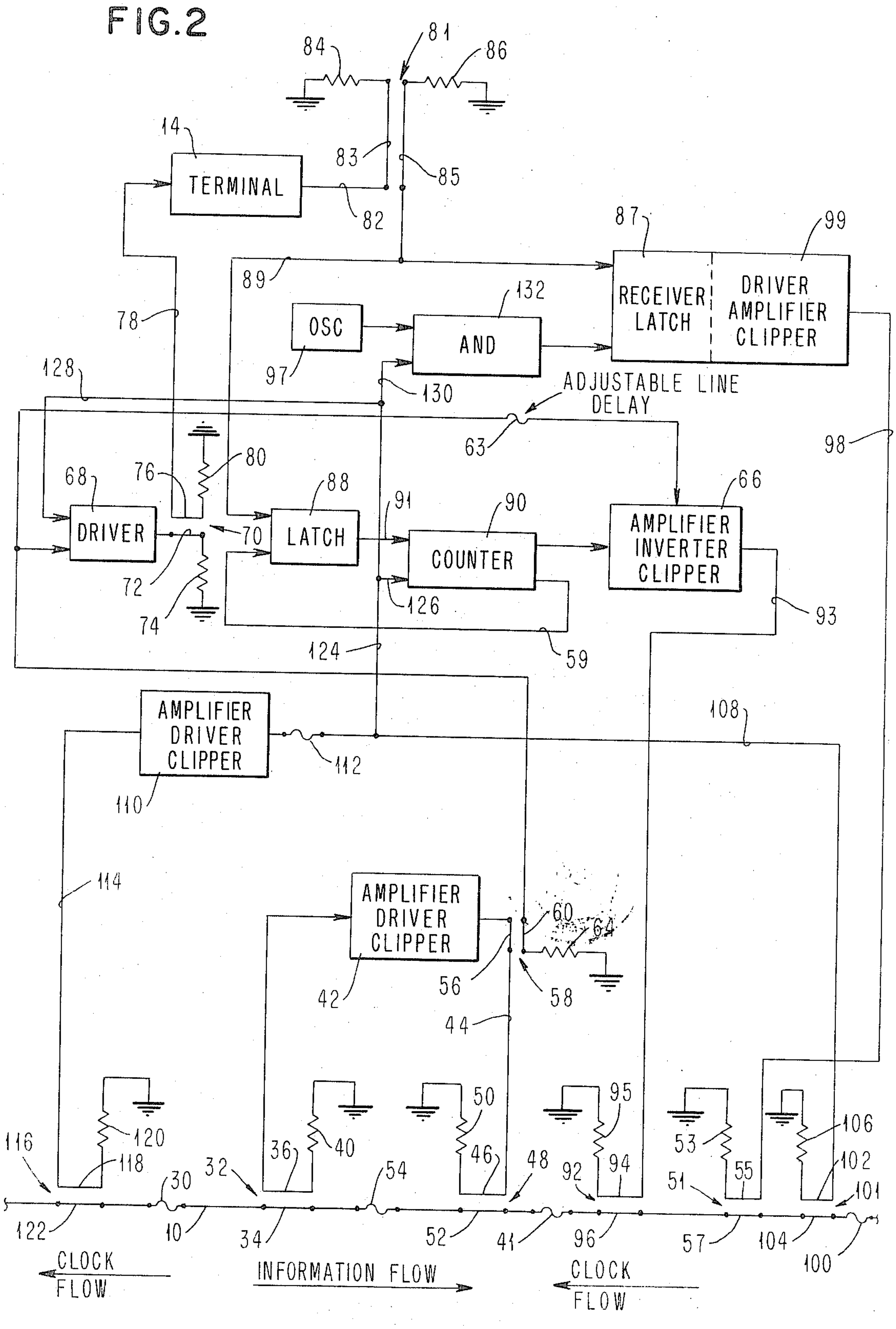
FIG. 2 is a schematic diagram showing the details of the clock synchronization system within one of the communication system's controllers.

Referring to FIG. 2, there are shown the details of the controller 16 and the details of the synchronizing clock system applied thereto. The controller shown in FIG. 2 is essentially the same as shown in co-pending patent application Ser. No. 314,894, previously mentioned, except for the addition of the synchronization clock system. The information signals are placed on the main transmission medium 10 such as a transmission line by the host CPU 12 or by any one of the terminals 14 so that the signals propagate in a clockwise direction on the transmission medium. These information signals are in the form of a sinusoidal wave in which one complete period represents a bit of information and the absence of a period represents a 0 bit as can be seen from waveform A in FIG. 3. These information signals approach the controllers 16 from the left as shown in FIG. 2. An adjustable line delay 30 is provided to adjust the phase of the transmission line information signals with relation to the position of the coupler 32. The information is obtained from the main transmission line 10 by a directional coupler 32 which is capable of extracting energy from the transmission line information signal by coupling without destroying the information on the transmission line. The directional coupler 32, shown schematically, is of the stripline variety which has two conductive segments extending parallel to one another. Generally, stripline type conductors are mounted on a substrate made of a non-conductive material such as epoxy glass and are arranged between two ground planes which usually consist of sheets of copper arranged over and under the conductors. One conductive segment 34 of the directional coupler 32 forms part of the main transmission line 10 while the other conductive segment 36 has one end connected to the branch transmission line 38 and the other end terminated by terminating resistor 40. The coupling takes place along the length of the conductive segments 34,36. The coupler operation depends upon the steepness of the indicent pulse rise and fall time. The width or duration of the pulse produced by the coupling is determined by the length of the two segments in parallel and the rise time of the incident pulse. The performance of the coupler is related to the impedances offered to signals on the transmission line and the coupling ratio, which are determined by the widths of the lines in the coupled region, the thickness of the lines, the distance between ground planes and the relative dielectric constant of the material. The coupled pulse travels in the opposite direction in the second conductive segment 36 to the direction of travel in the first conductive segment 34, which in this case, forms part of the transmission line 10. A stripline coupler is operated by the edge of the wave passing along one of the lines and this wave edge should have a rise or fall time that is equal to or greater than two times the electrical length of the coupled region in order that the relationship of the height of the induced pulse be related to the height of the driving pulse in the manner defined by the coupling ratio. The waveform coupled to the branch transmission line 38 via the coupler 32 is shown as waveform B in FIG. 3. This waveform is fed to amplifier-driver-clipper 42 where the waveform is amplified and clipped to give the negative pulses as shown in waveform C of FIG. 3. The output of amplifier-driver-clipper 42 travels along the second portion of the branch transmission line 44 which is connected to one end of a conducting segment 46 of a second directional coupler 48. The other end of this conducting segment 46 of the directional coupler 48 is terminated in a terminating resistor 50. The other segment 52 of the directional coupler 48 forms part of the transmission line 10. By means of coupler 48, the signal on the branch transmission line, after being amplified, is coupled back to the transmission line propagating in the same direction as the original information on the transmission line. An adjustable line delay 54 is introduced between the first directional coupler 32 and the second directional coupler 48 so that the amplified version of the signal can be superimposed on the original information remaining on the transmission line 10.

The output of the amplifier-driver-clipper 42 also contains another segment 56 of a directional coupler 58. The other segment 60 of this directional coupler 58 is connected to a further branch line 62 while the other end of the conductive segment 60 is terminated in a terminating resistor 64. The resulting signal following directional coupler 58 shown as waveform D in FIG. 3 forms the input to an amplifier-inverter-clipper 66 and is also fed to a driver 68. The driver 68 transforms the pulses into signals having a sharp rise time and a slow fall time as shown in waveform E of FIG. 3. These pulses are applied to a directional coupler 70 which has one segment 72 connected to the output of the driver circuit 68 and has the other end connected to a terminating resistor 74. The other conducting segment 76 of the directional coupler 70 has one end connected to a further branch line 78 which connects to the terminal or input/output attachment 14. The other end of this conducting segment 76 is terminated in terminating resistor 80. The pulses following the directional coupler 70 have a positive and negative pulse waveform on the branch line 78 going to the terminal 14 which has a positive pulse waveform as shown as pulse waveform F in FIG. 3. The terminal 14 examines the information coming in, for example, it analyzes the address portion and other information contained in the frame of information and then determines if it can modify this particular frame of data or not. If it cannot modify the data, no signals are produced by the terminal and therefore no signal is coupled through coupler 81 and, as a result, no information is put onto the main transmission loop 10 from the terminal 14.

Figure 3:
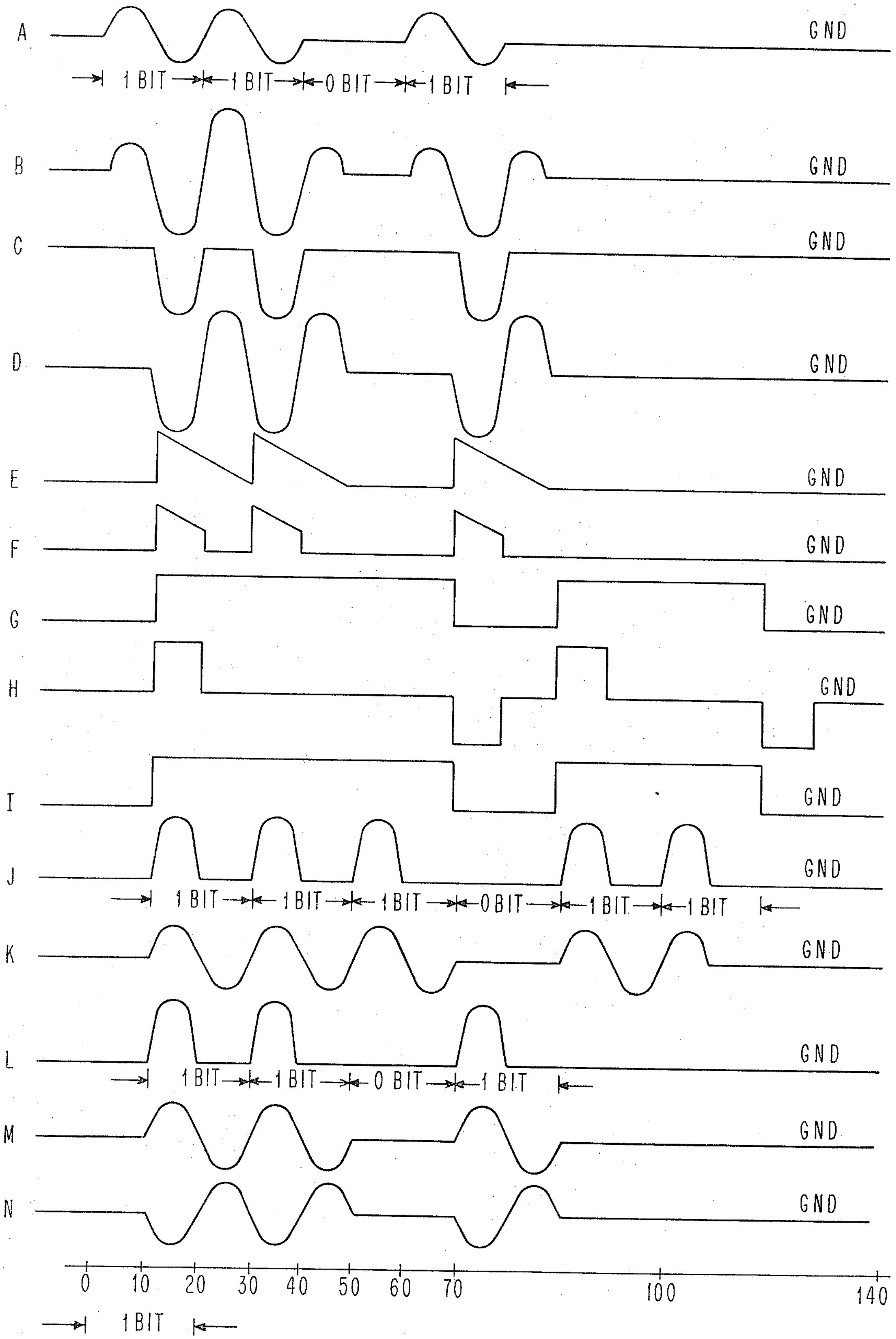
FIG. 3 is a schematic representation showing the waveforms generated in the multi-terminal communication system.

If the terminal 14 wishes to modify or put new information onto the frame of data that it is receiving, it puts the information onto an output line 82 which is connected to one end of a conductive segment 83 of directional coupler 81. This output information will be in the form of pulse waveform G in FIG. 3. The other end of the conductive element 83 is terminated in a terminating resistor 84. The other conductive element 85 of the directional coupler 81 has one end connected to a terminating resistor 86 and the other end connected to a receiver latch 87. The output from directional coupler 81 which is shown as waveform H in FIG. 3 also goes to a latch 88 via connector 89. The first pulse in the frame from the terminal 14 passes through the directional coupler 81 and is applied to both the receiver latch 87 and the latch 88 via line 89 where it energizes latch 88 which, in turn, energizes a counter 90 via line 91. The counter 90 is preset to count the number of pulses which can be in a frame. For example, the frame can contain 90 pulses. Each count from the counter 90 provides a gating pulse to the amplifier-inverter-clipper 66 which allows the successive pulses on the branch information line 62 to pass through the amplifier-inverter-clipper 66 where signals are amplified, clipped and phase inverted. Branch information line 62 includes an adjustable line delay 63 for adjusting the phase of the signal before being amplified, inverted and clipped. This inverted phase signal, shown in waveform L in FIG. 3, is applied to directional coupler 92 via connector 93. The first conductive segment 94 of this coupler is connected at one end to the output line 93 from the amplifier-inverter-clipper 66 and at the other end to a terminating resistor 95. The other conductive element 96 forms a part of the main transmission line 10 downstream from the amplifier section of the controller. The directional coupler 92 is placed in the transmission line 10 with respect to coupler 32 such that the out-of-phase signal when coupled to the main transmission line 10 by coupler 92 causes erasure of the signal remaining on the main transmission line 10 after the coupling out at coupler 32. Waveform M of FIG. 3 shows the signals produced by coupling waveform L through directional coupler 92. It should be noted that waveform M has the opposite phase of waveform N which represents the signals on the main transmission line 10 at coupler 92. An adjustable line delay 41 is provided in the transmission line 10 before the directional coupler 92 to adjust the phase of the transmission line signal with respect to the location of coupler 92.

The pulses from the directional coupler 81, which form the new information, control the receiver latch 87. For example, the first pulse of waveform H of FIG. 3 turns on the receiver latch 87 and the following negative pulse turns off the receiver latch. During the time that the receiver latch 87 is on, (waveform I, FIG. 3), oscillator 97 provides sinusoidal signals representing bits of information which pass through driver-amplifier-clipper 99 onto the output branch line 98. The signals on output branch line 98 are represented by waveform J of FIG. 3. Thus, the terminal pulse type signals are converted to sinusoidal type signals which are more compatible with the signals on the main transmission line 10. Actually, the signals on the output branch line 98 after being coupled to the main transmission line 10 result in sinusoidal type signals (see waveform K of FIG. 3) which are compatible with the other signals on the transmission loop. The output from the driver-amplifier-clipper 99 is connected to a conductive element 55 of a further directional coupler 51 which has the output branch transmission line 98 connected at one end and a terminating resistor 53 connected at the other end. The other conductive element 57 of this directional coupler 51 is part of the main transmission line 10 adjacent the first conductive element. Coupler 51 couples the output of the driver-amplifier-clipper 99 onto the transmission line 10 in the time frame which was erased by the previous directional coupler 92. Thus, new information replaces the old information on the main transmission line.

The last count from counter 90 goes to the latch circuit 88 via connection 59 to de-energize it so that the one frame of information only is passed through the amplifier-inverter-clipper.

Figure 4:
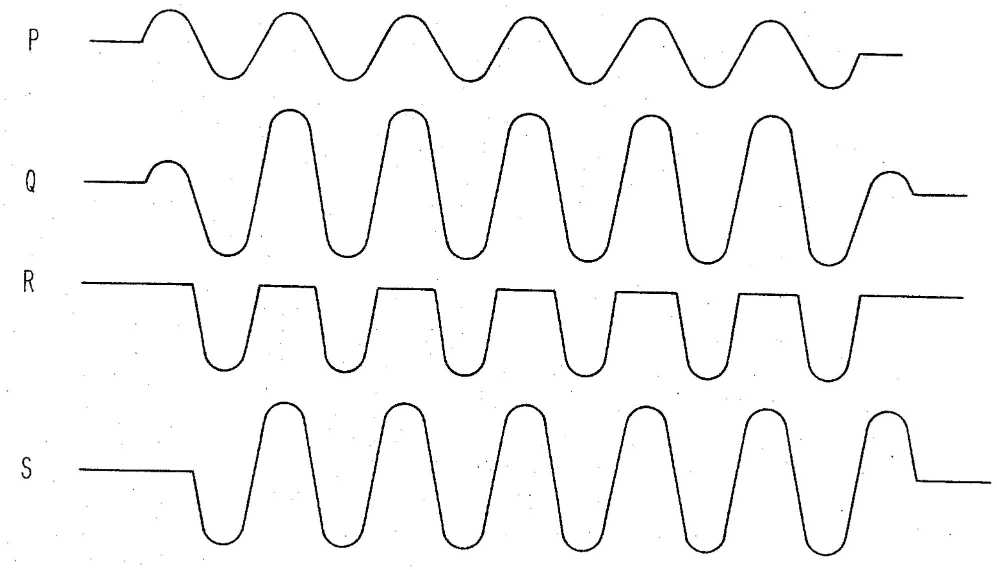
FIG. 4 is a schematic representation showing the waveforms associated with the clock data of FIG. 2.

As was previously described, the clock pulses are generated at a clock pulse source 15 within the host CPU 12 and applied to the main transmission line 10 propagating in the opposite direction to that of the information signals. That is, the information signals flow clockwise on the main transmission line 10 while the clock signals flow counter-clockwise on the same main transmission line 10. Referring again to FIG. 2, there are shown the details of how the clock pulses are applied to the communication system controllers. An adjustable line delay 100 is located in the transmission line 10 just before directional coupler 101 approaching from a counterclockwise direction. This adjustable line delay 100 adjusts the phase of the clock pulse signals with respect to the location of the directional coupler 101 on the transmission line. The directional coupler 101 has a first conductive segment 104 connected in the main transmission line 10 and a second conductive element 102 located adjacent thereto. The second conductive element 102 has one end connected to a terminating resistor 106 and the other end connected to a line 108. This directional coupler 101 couples the clock pulses from the main transmission line to line 108. The waveform of the clock pulses on the transmission line 10 is shown as waveform P in FIG. 4. The waveform after coupling through the coupler 101 resulting on line 108 is shown as waveform Q in FIG. 4. As was the case in connection with the directional couplers previously described, the clock pulses on the main transmission line continue to propagate along the transmission line following the directional coupler 101. The clock pulses on branch line 108 are fed to an amplifier-driver-clipper 110. An adjustable line delay 112 is located in the line 108 before the amplifier-driver-clipper 110. This delay adjusts the phase of the clock pulses entering the amplifier-driver-clipper 110 with respect to the clock pulses remaining on the transmission line 10. The amplifier-driver-clipper amplifies and clips the clock pulses to produce negative pulses as shown in waveform R of FIG. 4. These negative pulses are applied to a directional coupler 116 connected into the main transmission line 10. This directional coupler 116 consists of a first conductive element having one end connected to the branch line 114 and the other end connected to a terminating resistor 120. The second conductive element 122 is connected into the main transmission line 10. This directional coupler 116 couples the negative pulses on branch line 114 onto the main transmission line 10. The pulses coupled onto the main transmission line are shown as waveform S in FIG.

4. These pulses are an amplified version of the clock pulses. The directional coupler 116 is located with respect to the directional coupler 101 such that these amplified clock pulses are superimposed upon the clock pulses which remain on the main transmission line 10 after the coupling-off by the directional coupler 101. Thus, the amplifier-driver-clipper 110 acts as a means for amplifying the clock pulses at each of the controllers in the system. The clock pulses on branch line 108 are also applied to connecting line 124. These clock pulses are connected from the line 124 to counter 90 via connector 126. The clock pulses are also connected to driver 68 by a connecting line 128 which runs from the line 124 to the driver. The clock pulses are also connected via an input line 130 to an AND circuit 132 which synchronizes the output of oscillator 97 with the clock pulses. The AND circuit responds only when the inputs from line 130 and oscillator 97 are present simultaneously. The output from the AND circuit 132 goes to receiver latch 87 and, subsequently, is applied to driver-amplifier-clipper 99 as previously described.

It will be appreciated, that the clock pulses are applied to the various sections of the controller to insure synchronization of the data pulses with the clock pulses. For example, the clock pulses are applied to driver 68 which is in the receiver section of the controller to ensure that the information pulses obtained from the transmission line are synchronized with the clock pulses before being sent to the terminal 14. Also, the send section of the controller is synchronized by applying the clock pulses to AND circuit 132 so that the pulses being formed by the oscillator are in synchronization with the clock pulses. The erase function of the controller is synchronized with the clock pulses by applying the clock pulse synchronization to the counter 90 which in turn gates the information pulses obtained from the main transmission line to amplifier-inverter-clipper 66 as previously described.

It should be noted, that the clock pulses as they propagate along the transmission line 10 following the coupling off at directional coupler 101, tend to be coupled from the transmission line by the various directional couplers which are used to put information onto the transmission line. For example, directional couplers 51, 92 and 48 are all arranged to place information onto the transmission line travelling in a clockwise direction. These couplers because of the tendency to couple clock pulses from the line are arranged to provide a loose coupling. That is, they are arranged with a greater spacing between the conductive elements such that the coupling is less. Accordingly, a very low voltage signal is coupled onto the branch line connected to these couplers. This loose coupling is no particular problem for the coupling of the information signals onto the transmission line from the branch lines, since each of these branch lines includes an amplifier capable of amplifying the signal sufficiently such that the desired signal is obtained from the coupler even though the loose coupling exists. The clock pulses are also coupled into directional couplers 32 and 116 but, because of the reverse direction coupling, the coupled signals are terminated in the terminating resistors of the respective couplers. A similar loose coupling is required in connection with coupler 116 where the information pulses tend to couple through the coupler onto branch line 114. As was the case in connection with the clock pulses, the information pulses coupled onto branch line 114 through the coupler 116 are of sufficiently low voltage to cause no problem. It should also be noted, that the clock pulses put on branch line 114 are driven by amplifier-driver-clipper 110 and are of sufficient voltage that the loose coupling of coupler 116 reduces the voltage of the pulses to the desired level for producing the amplification of the clock pulses upon which they are superimposed on the transmission line 10.

It will be appreciated, that the clock pulses and data flow in opposite directions on the single transmission line simultaneously. The clock flow, initiated by the host unit, travels in a counterclockwise direction and permeates the transmission loop, and of course, all the controllers attached to it. The data flow is initiated at the host unit or one of the terminals and propagates in a clockwise fashion on the transmission line. The existence of the information pulses and clock pulses simultaneously on the same transmission line is made possible because of the ability of the directional coupler to differentiate between two signals of equal amplitude and equal frequency propagating in opposite directions. This system in no way impedes the information data transfer rate and yet provides for a complete synchronous clocking system.

While the invention has been particularly shown and described with reference to a preferred embodiment thereof, it will be understood by those skilled in the art that the various changes in form and detail may be made therein without departing from the spirit and scope of the invention.

What is claimed is:

1. In a multi-terminal communication system having coupling connecting devices;

at least one source of information signals;

a transmission medium along which said information signals are propagated in one direction;

means for coupling said information signals to and from said transmission medium;

a source of clock signals, said clock signals propagating along said transmission medium in the opposite direction to said information signals; and means for coupling said clock signals from said transmission medium, said clock signals providing the synchronization for said system.

2. In a system according to claim 1, wherein said transmission medium is a single transmission line along which said information signals are propagated in one direction and said clock signals are propagated in the opposite direction.

3. In a system according to claim 1, wherein said means for coupling said information signals to and from said transmission medium comprises a first directional coupler arranged to couple information signals to a branch line and second direction coupler arranged to couple information signals from a branch line to said transmission line in the direction of propagation of said information signals on said transmission line.

4. In a system according to claim 1, wherein said means for coupling said clock signals from said transmission medium is a directional coupler arranged to couple clock signals to a branch line and essentially terminate information signals.

5. In a system according to claim 1, further comprising:

amplifying means in at least one of said terminals for amplifying said clock signals coupled from said transmission medium, and further clock signal coupling means for coupling said amplified clock signals onto said transmission medium at a location so as to be superimposed on said clock signals from which said clock signals coupled from said transmission medium were obtained.

6. In a system according to claim 5, wherein said further clock signal coupling means comprises a directional coupler for coupling said amplified clock signals onto said transmission medium so as to propagate in the clock signal direction along said main transmission medium and for essentially terminating information signals coupled from said main transmission line.

7. In a system according to claim 6, wherein an adjustable delay is provided before said amplifying means so as to adjust the phase of said clock signals coupled from said transmission medium with respect to said clock signals propagating along said transmission medium from which said clock signals were coupled.

8. In a system according to claim 2, wherein another adjustable delay is included in said main transmission line before said means for coupling said clock signals from said transmission line to adjust the phase of said clock signals with respect to the location of said means for coupling.

9. In a multi-terminal communication apparatus comprising:

a controller for each terminal;

a transmission medium linking each controller;

at least one source of information signals; said information signals propagating along said transmission medium in one direction;

coupling means for coupling branch information signals from the transmission medium to said controller and from said controller to said transmission medium;

coupling means for coupling said branch information signals to said terminal;

coupling means for coupling new information signals to said controller;

means for inverting the phase of said branch information signals;

a source of clock signals, said clock signals propagating along said transmission medium in the opposite direction to said information signals;

means for coupling said clock signals from said transmission medium; and means for connecting said coupled clock signals to said controller to synchronize the branch information signals, the new information signals and the inverted phase information signals.

* * * * *